US009973770B2

(12) United States Patent
Bertolotti et al.

(10) Patent No.: US 9,973,770 B2
(45) Date of Patent: May 15, 2018

(54) NEAR-REAL TIME ENCODING OF LINEAR SIGNAL

(71) Applicant: Sky Italia S.R.L., Milan (IT)

(72) Inventors: Massimo Bertolotti, Milan (IT); Stefano Crespi, Milan (IT)

(73) Assignee: Sky Italia S.R.L., Milan (IT)

( * ) Notice: Subject to any disclaimer, the term of this patent is extended or adjusted under 35 U.S.C. 154(b) by 80 days.

(21) Appl. No.: 14/890,901

(22) PCT Filed: May 12, 2014

(86) PCT No.: PCT/IB2014/000709
§ 371 (c)(1),
(2) Date: Nov. 12, 2015

(87) PCT Pub. No.: WO2014/184632
PCT Pub. Date: Nov. 20, 2014

(65) Prior Publication Data
US 2016/0127737 A1 May 5, 2016

(30) Foreign Application Priority Data

May 13, 2013 (IT) .............................. MI2013A0785

(51) Int. Cl.
*H04N 7/12* (2006.01)
*H04N 19/436* (2014.01)
(Continued)

(52) U.S. Cl.
CPC ........... *H04N 19/436* (2014.11); *H04N 19/00* (2013.01); *H04N 19/114* (2014.11); *H04N 19/119* (2014.11)

(58) Field of Classification Search
CPC .. H04N 19/436; H04N 19/119; H04N 19/114; H04N 19/00
See application file for complete search history.

(56) References Cited

U.S. PATENT DOCUMENTS 6,314,576 B1 11/2001 Asamizuya et al.
8,184,702 B2 * 5/2012 Jeong .................... H04N 19/70
375/240.01
(Continued)

FOREIGN PATENT DOCUMENTS

WO WO 96/13125 5/1996
WO WO 2004/051982 6/2004

OTHER PUBLICATIONS

Technical Document submitted to CSI Award competition organized by the CSI Magazine, available prior to May 13, 2013 (exact date unknown) (6 pages).
(Continued)

*Primary Examiner* — Tat C Chio
(74) *Attorney, Agent, or Firm* — McCarter & English, LLP

(57) ABSTRACT

A near-real time encoding of a signal comprising at least a video signal is disclosed. The encoding comprises acquiring the video signal included in a linear stream, the linear stream comprising at least two contents without a logical distinction between them, dividing the video signal into at least a first segment and a second segment of respective preset durations, at least one of the segments being capable of containing at least a part of said two contents and comprising recomposing information, executing a first encoding of said first segment using an off-line encoding to obtain a first encoded segment, executing a second encoding of said second segment using an off-line encoding to obtain a second encoded segment, said second encoding being executed at least partially in parallel with the first encoding, recomposing, using said recomposing information, said first and second encoded segments to obtain a continuous encoded signal.

11 Claims, 4 Drawing Sheets

(51) Int. Cl.
    *H04N 19/00*     (2014.01)
    *H04N 19/114*     (2014.01)
    *H04N 19/119*     (2014.01)

(56) References Cited

U.S. PATENT DOCUMENTS

| | | |
|---|---|---|
| 9,100,657 B1 * | 8/2015 | Jia .................. H04N 19/105 |
| 2005/0195899 A1 | 9/2005 | Han |
| 2006/0029128 A1 | 2/2006 | Tahira et al. |
| 2012/0047229 A1 | 2/2012 | Bennett |
| 2012/0051436 A1 * | 3/2012 | Chen .............. H04N 21/23406 |
| | | 375/240.25 |
| 2013/0268963 A1 * | 10/2013 | Nugent ............... H04N 21/435 |
| | | 725/32 |

OTHER PUBLICATIONS

International Search Report of the International Searching Authority dated Oct. 10, 2014, issued in connection with International Patent Appln. No. PCT/IB2014/000709 (4 pages).

Written Opinion dated Oct. 10, 2014, issued in connection with International Patent Appln. No. PCT/IB2014/000709 (7 pages).

* cited by examiner

NEAR-REAL TIME ENCODING OF LINEAR SIGNAL

RELATED APPLICATIONS

This application is a U.S. National Phase Application under 35 U.S.C. 371 of International Application No. PCT/IB2014/000709 filed May 12, 2014, which was published on Nov. 20, 2014, under International Publication Number WO 2014/184632 A1, which claims the benefit of Italian Patent Application No. MI2013A000785 filed on May 13, 2013. These applications are incorporated herein by reference in their entirety.

The present invention relates to the encoding of linear signals, in particular near-real time encoding of a video signal included in a linear stream.

BACKGROUND OF THE INVENTION

At present, the transmission of channels and contents in the broadcast mode (satellite, cable, terrestrial) is based on the concept of having a playout system which sequentially emits, via a playlist, a series of channels and/or contents. The channels can be sent in SDI (Serial Digital Interface) format or through IP (Internet Protocol) streams over an Ethernet network toward a system of real-time compression, which is typically composed of one or more encoders (for example complying with MPEG2, MPEG4, AVC, H.264 standards) which perform the compression either in a CBR mode (Constant Bit Rate, i.e. parameters and a fixed bit rate are assigned to the components audio, video and channel data) or VBR (Variable Bit Rate). In particular, the VBR process exploits, frame by frame, a statistic to give more bandwidth to the channel (of a group of channels) which has contents requiring more bandwidth in order to have a good quality as compared to other channels in the same frame requiring less bandwidth; in this manner, for example, it is possible to maintain the total bandwidth (for example of a transponder and/or a digital terrestrial Mux) of the different channels of the group fixed.

To date, the management of compression, though optimized by the VBR process, has been based on real-time compression with a latency, i.e. the time difference between the instant at which a frame enters the encoder and the instant at which it is output compressed, which varies from a few milliseconds to a few seconds (for example two seconds).

The encoder thus has only a few available frames to analyze; the compression routines therefore cannot perform accurate analyses of the video, which determines a limit to their ability to reduce (compress) the video stream in terms of the ratio between quality and size of the data flow (bit rate or bandwidth) compared to what can be obtained with encoders that work off-line (for example encoders for VOD, Video On Demand) and which thus have the possibility of analyzing the entire video.

Therefore, the known types of encoding currently applied to linear streams of content require a high transmission bandwidth for the reasons set forth above.

SUMMARY OF THE INVENTION

The present invention has the object of remedying the problems tied to the known techniques for encoding linear streams.

A first aspect of the invention envisages a method for near-real-time encoding of a signal comprising at least a video signal, the method comprising the steps of:
  acquiring the video signal included in a linear stream, wherein the linear stream comprises at least two contents without a logical distinction between them;
  dividing the video signal into at least a first and second segment of respective preset durations, at least one of the two segments being capable of containing at least a part of the two contents and comprising recomposing information;
  executing a first encoding of the first segment using an off-line encoding to obtain a first encoded segment;
  executing a second encoding of the second segment using an off-line encoding to obtain a second encoded segment, wherein the second encoding is executed at least partially in parallel with the first encoding;
  recomposing, using the recomposing information, the first encoded segment and the second encoded segment to obtain a continuous encoded signal.

A second aspect of the invention envisages an entity for near-real-time encoding of a signal comprising at least a video signal, the device comprising:
  acquiring means for acquiring the video signal included in a linear stream, the linear stream comprising at least two contents without a logical distinction between them;
  dividing means for dividing the video signal into at least a first segment and a second segment of preset duration, at least one of the segments being capable of containing at least a part of the two contents and comprising recomposing information;
  first encoding means for executing a first encoding of the first segment using an off-line encoding to obtain a first encoded segment;
  second encoding means for executing a second encoding of the second segment using an off-line encoding to obtain a second encoded segment, said second encoding being executed at least partially in parallel with the first encoding;
  recomposing means for recomposing, using said recomposing information, the first and second encoded segment to obtain a continuous encoded signal.

A third aspect of the invention envisages a method for treating a signal to be processed with near-real-time encoding, said signal comprising at least a video signal, said method comprising the steps of:
  acquiring the video signal included in a linear stream, said linear stream comprising at least two contents without a logical distinction between them;
  dividing the video signal into at least a first segment and second segment each having respective preset duration, each of the segments being capable of containing at least a part of said two contents without logical distinction and comprising recomposing information.

A fourth aspect of the invention envisages a program for a computer configured to execute, when said program is run on a computer, all of the steps according to any of the methods envisaged by the above-described aspects.

LIST OF FIGURES

DETAILED DESCRIPTION

Figure 1:
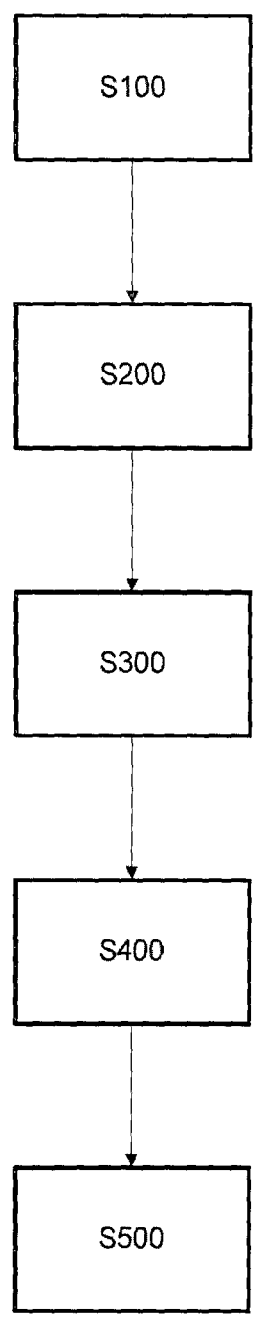
FIG. 1 illustrates a flow diagram of a method for near real-time encoding of signals according to a first embodiment.

The inventors, on the basis of their considerations and analyses of the known techniques for encoding linear channels, have observed that one possibility for improving the ratio between quality and bit rate is to use an off-line compression process. Off-line compression is in fact particularly efficient: the quality of the output being equal, it can compress 40% more content than a real-time compression. However, it requires a long and accurate process, because the entire content may have to be processed several times; in order to maintain a high level of quality, moreover, the encoded signal must be analyzed to detect imperfections in the compression process; the imperfections detected can thus be removed and/or corrected. This accurate process can require 2-3 times the duration of an individual content. It should however be noted that off-line compression processes individual contents and not continuous streams of contents, i.e. contents that have a beginning and an end. The product of the compression, even when placed in sequence, does not lose this individuality. In fact, contents compressed off-line, when joined in sequence, do not have an end that fits perfectly with the beginning of the subsequent content and to ensure a splice between contents it is necessary to insert "black" elements.

This is due to the fact that off-line contents, even when joined in sequence, are distinct logical units since they belong to two distinct units, for example two distinct files or two distinct data flows. More in particular, in compressed content (whether it be a file or a stream) each frame is distinguished by two "counters", PTS (Presentation Time-Stamp) and DTS (Display TimeStamp). The former numbers the transmission sequence of the frames, whereas the latter indicates the playing order. These numbers must be monotonically increasing within the content, and the first frame of the content normally has a randomly selected number. When two contents are concatenated, it is very likely that the two counters will violate the constraint of monotonic increase. This makes it necessary to initialize the two counters, as well as other parameters, when starting to process a second content. This renders the reproduction of two separate contents encoded off-line unsuitable for linear reproduction.

Thanks to the present solution, it is possible to obtain an encoding process that can ensure a compression with a greater efficiency than is presently available on the market, offered by technology providers, while maintaining unchanged the playout, compression and transmission processes, that is, without requiring substantial modifications to the architecture of existing solutions.

The inventors have however recognized, among other factors, the problem that in real-time compression, well known to be applied to the encoding of linear channels, the encoding must be carried out in reasonably fast times, which precludes obtaining a particularly high compression factor, since this would require different processing operations on the signal and quality checks that cannot be done in fast times.

On the other hand, in the case of a more accurate compression such as off-line compression, there is an extremely long delay. In addition, off-line compression is not suitable for compressing linear channels, because it operates on each content as a separate logical unit and is thus not capable of processing a continuous stream in which two or more items of content have been joined without logical distinction.

Based on the above considerations and their own recognitions, the inventors propose a system for optimizing the procedures of compressing contents intended for distribution via broadcasting. In particular, they suggest exploiting the mechanisms of off-line compression, managing them in a time such as to ensure a configurable, predictable delay, the delay being preferably comprised between about ten seconds and a few minutes. This encoding method can be defined as near live or near real-time and will be illustrated below with reference to the different embodiments, variants thereof and examples.

With reference to FIG. 1, a first embodiment of the invention will be illustrated which relates to a method for near-real-time encoding of a signal comprising at least one video signal. Near real-time encoding means an encoding wherein the latency (delay) introduced by the encoding is constant (or also nearly constant, as illustrated further below) and configurable, and whose typical values are preferably comprised between about ten seconds and a few minutes (the values are illustrative and not limiting).

Figure 2:
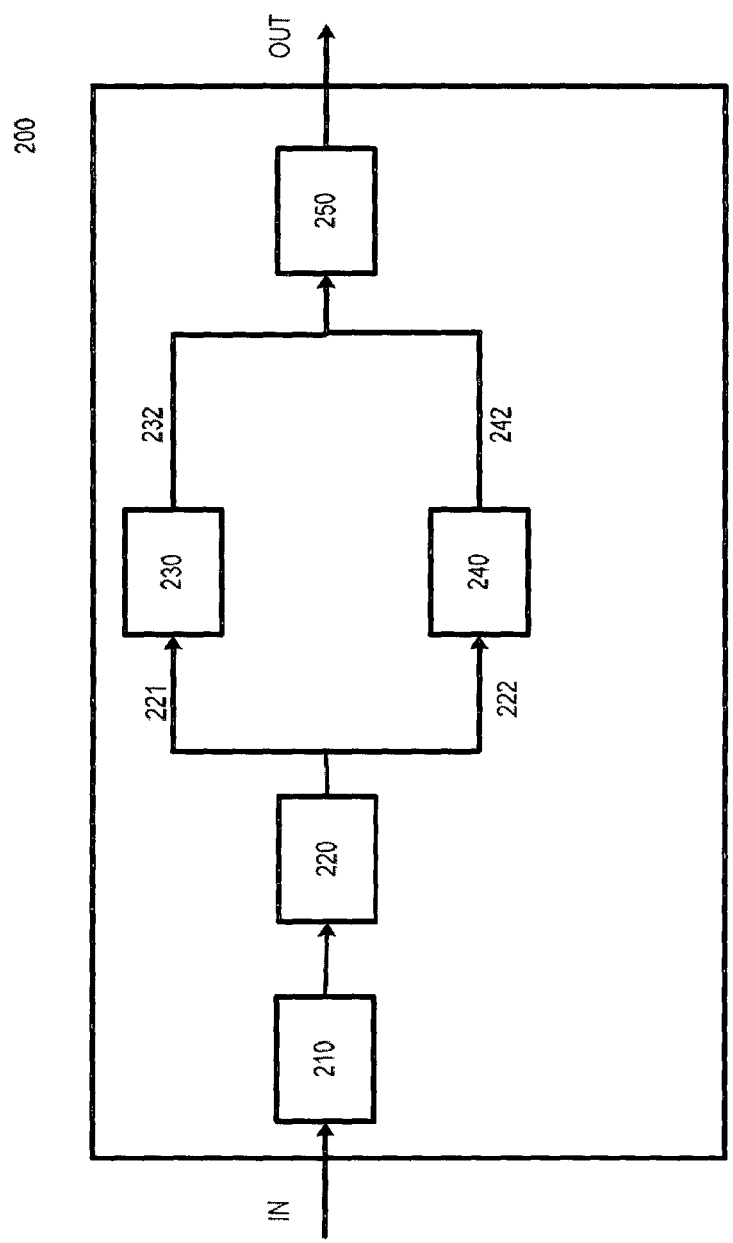
FIG. 2 illustrates a block diagram of an entity for near real-time encoding of signals according to a second embodiment.

In step S100 the method acquires a video signal included in a linear stream. The linear stream, or also linear channel, comprises at least two contents without a logical distinction between them. Content means at least one among audio, video and data services corresponding to those that may be enjoyed by a user. Subtitles or applications (interactive or non-interactive) are examples of a data service. Examples of content are films, ads, promos, variety shows, etc. Therefore, a linear stream comprising the acquired video signal includes at least two video services (as already said, without a logical distinction between them). The lack of a logical distinction (or continuity) indicates that the two contents, for example the two video services, are sequential without temporal or logical interruptions. As seen earlier in the previous example, the two contents are characterized by PTS and DTS having a correct sequence. In the event that an intentional interruption is desired between two videos representing two television programs, for example a pause or a break (for example black), the flow will contain that interruption interposed between the two programs and without being logically separated from the two units representing the programs themselves. In this respect, the interruption can be considered like a unit of content (or a video service) placed between the two television programs and logically continuous with the programs themselves within the linear stream. The acquisition process of step S100 can be carried out by means of a specific acquisition board mounted, for example, on a server, or by the acquiring means 210 with reference to FIG. 2, illustrated further below. The acquired signal can be in any format known in the art, for example in SDI, HD-SDI, MPEG-2, MPEG-4, AVC, H.264 format, etc. . . . . The acquired signal, if in a MPEG-2, MPEG-4, AVC, H.264 format, etc., can be obtained by applying an encoding, for example real-time encoding, on a digital signal (or analog signal, after due conversion), which can be, for example, available in the SDI or HS-SDI format.

In a step S200, the video signal is divided into at least a first segment and a second segment of respective preset durations (as will become more apparent further below, the two segments can have a different length due to different variances or tolerances or because the length is reconfigured). The preset duration can be established once and for all or modified on a periodic basis either manually, for example via configuration by an operator, or automatically, for example by means of a supervision device which cyclically changes the duration of the segment, or on the basis of alarms or signal analysis. Preset duration means an established duration or an established duration plus or minus an established variance, as explained further below.

Therefore, it is possible for two consecutive segments into which the linear stream is divided to have a different duration, both because the preset duration has been varied in the meanwhile or because it is varied within the tolerance corresponding to the established variance.

Each of said segments is capable of containing at least a part of the two contents mentioned. This means that each segment (into which the stream is divided) need not necessarily contain part of both contents; however, it must be provided for this to occur when necessary. In this respect, a segment into which the linear stream is divided is different from a GOP, since a GOP by definition can contain only a part relating to one content and not simultaneously parts relating to two contents, the two contents being distinct and relating to two distinct logical units. We may consider the example of a news program followed by an advertising break, in turn followed by a weather report. In the division of the stream, many of the segments will contain only a part of one of the three units making up the stream, while it will be possible that at least two segments each comprise a part of two distinct streams (in particular, a segment will in all likelihood contain part of the news and part of the advertising; another segment, following the other or remote from it, may contain part of the advertisement and part of the weather report). Though a content, for example the weather report, may be shorter than the length of a segment, there will also be cases in which a segment includes a unit of content in its entirety. It can also not be ruled out that a content (for example the news) may end exactly at the end of a segment. Examples in which the segment has a length of 1 or 2 minutes (possibly with the tolerance imposed by the pre-established variance) will be illustrated below; however, the solution described here is not limited to such values. In fact, a different segment length is also suitable, provided that it is sufficiently greater than the number of frames a real-time encoder works on. For example, in the case of a real-time encoder working on an average of 12 frames, a segment will have a length equal to at least three times the number of real-time frames, preferably at least 5 times, and even more preferably 10 times. In fact, the longer the segment is relative to the number of frames the real-time encoder is operating on, the larger the advantage derived from off-line encoding will be. However, as the length (and the tolerance or variance thereof) is configurable, it is possible to maintain a predictable, controllable delay.

The segments further comprise composition information to enable the reconstruction of the (encoded) linear stream once the compression of each of the segments is completed. It is in fact important to ensure that the encoded (or output) segments maintain the same sequence as the frames we had prior to segmentation. The composition information, which hereinafter will also be referred to as IN/OUT information, is represented, for example, by a sequential numbering assigned to each segment, or by a unique identifier assigned to each segment (the identifier can be associated, for example, with the relative or absolute position of the segment in the stream and/or with the channel the segment belongs to, or an identifier corresponding to or derived from one or both the PTS and DTS values mentioned above, etc. . . . ).

In a step S300, the method involves executing a first encoding of the first segment using an off-line encoding to obtain a first encoded segment. The first encoding of the first segment can begin when the whole segment has been received or when at least a portion of it has been received, the length of the portion depending on the selected encoding parameters. Optionally and preferably, the encoding begins when a substantial part of the segment is received by the assigned encoder (for example, see above, when at least 5, 7 or 10 times the number of frames of a real-time encoder have been received), in order to be able to carry out a detailed analysis on a significant number of frames and thereby obtain a higher compression factor as compared to a real-time algorithm operating on a much more limited number of frames.

Off-line encoding here means encoding without real-time time constraints, that is, with predefined, configurable time constraints. In other words, off-line encoding means an encoding whose parameters are set in such a way as to complete the entire encoding process on a segment within a preset and configurable time interval (at the most within a certain tolerance limit); in one example this interval is preferably comprised between about ten seconds and a few minutes. Since it is possible to analyze a large number of frames, potentially even all frames of the segment, it is possible to obtain a higher compression factor than in the case of real-time encoding, without compromising quality. The presence of two contents within the segment is however transparent to the off-line encoding algorithm, since the two contents are sequential and without any logical distinction. This is a distinguishing feature compared to the common use of off-line encoders: in fact, in the prior art an off-line encoder is applied to a first content and, once the encoding of the latter is completed, to a second content, the joining together of which requires the insertion of an artificial and uncontrollable (or not so easily controllable) and/or unlikely to be configurable pause. In contrast, the segmentation as described above enables the two contents or part of the two contents to be processed within the same segment in a manner that is transparent to the off-line encoding algorithm. In other words, the off-line encoding need not know or worry about the beginning or end of the contents, as it only has to process each segment as a separate unit.

In a step S400, a second encoding of the second segment is executed using an off-line encoding to obtain a second encoded segment. The off-line encoding used in step S400 can preferably be the same as that used in the first encoding but is not necessarily the same. In one example, the encoding parameters applied to the first segment can be the same as or different from those applied to the second segment. As will be illustrated further below, the first and second encoding can be carried out by two distinct hardware units, by the same hardware unit whose resources are duly partitioned or by any distributed or concentrated hardware/software combination. It should be noted that the second encoding according to step S400 is carried out at least partially in parallel with the first encoding of step S300. In other words, the second encoding begins when the first encoding has not yet been completed. The second encoding can be completed before, simultaneously with or after completion of the first encoding. Thanks to the at least partially parallel execution, it is easier to ensure that the encoding is carried out within a pre-established, configurable time interval and thus prevent the delay from increasing over time or with the number of segments processed. However, it cannot be ruled out that in the case of very large hardware/software resources it may be possible to carry out an encoding with a high compression of a first portion of the segment (when, for example, a substantial portion has been received, for example at least 5/7/10 times the number of frames of a real-time encoding) and an encoding—possibly with a lower compression—of a second part of the segment so that the total encoding of the segment is completed at the same time as or a few frames after the last frame of the segment is received. In such a case, the two segments could be processed sequentially so as to have a delay approximately equal to the length of the segment (and tolerance or variance if present). Reference is also made to the example illustrated further below with reference to FIG. 5.

In step S500, the first encoded segment and the second encoded segment are recomposed using the recomposing information so as to obtain a continuous encoded signal. The signal thus obtained can then be broadcast (for example via satellite, digital terrestrial, internet, mobile radio networks, etc. . . . ), directly or after having been optionally further processed according to need.

The off-line encoding is such that the encoding (or the various necessary processing operations) of the respective segment is completed in a time which is shorter than or equal to a pre-configured delay. The pre-configured delay can be set once and for all or can be varied manually or automatically; the variation can be made at pre-established intervals (for example at a certain frequency: every hour, day, or every number M of segments) or on the basis of other settings, e.g. alarms or the quality of the output signal. The pre-configured delay can also be placed in relation with the length of the segment; for example, it can be equal, in one example, to the sum of the length of the segment (and more in particular to the preset duration, expressed in minutes, seconds, or thousands of a second) and a predefined interval (likewise expressed in a unit of time). The predefined interval is a quantity greater than or equal to zero. In particular, when the value is equal to zero, it means that the delay will be equal to the length of the segment (or preset duration) and that the encoding will have to be last when the last frame of the segment has been received (see further below: in this case the compression of the last frames will be very low or absent). When, on the other hand, the predefined interval has a value greater than zero, it means that the off-line encoding will have more time available for encoding the whole segment once the last frame of the segment has been received. In the illustrative example of FIG. 5, the encoding must be completed in a pre-configured time of 4 minutes. This means that once the last frame of the segment has been received, the off-line encoding will have another two minutes available to complete the encoding. In this way it will be possible to control the overall delay and prevent it from building up in an unacceptable manner. The person skilled in the art recognizes that it is possible to vary different factors according to requirements, and in particular: segment length, delay and compression parameters (and/or computing power). For example, once the desired delay has been fixed, by decreasing the length of the segment it is possible to leave more time for off-line encoding, which will thus be able to process the available segments to a greater degree and/or carry out the encoding with lower performance HW and/or SW resources.

Analogous reasoning applies in the case in which a longer segment is selected. In a similar manner, by lengthening the delay, it will be possible increase the length of the segment (thus enabling the off-line encoding to analyze more segments) and/or give the off-line encoding more time to analyze the segment frames.

As mentioned above, the aforesaid first and second segments are distinct from the groups of frames obtained by means of a known video encoding algorithm such as MPEG2, MPEG4 or H.264 (wherein the GOP represents an example of the grouping). In fact, the segment can be obtained, for example, from an SDI signal which, even if it is compressed, does not have a structure with groups of frames. It is moreover important to observe that the segmentation is based on considerations of a configurable and predictable delay, whereas the group is determined by the encoder on the basis of considerations imposed by the encoding parameters. In other words, the choice of the segment length is dictated by or based on a desired latency, irrespective of evaluations concerning the encoding. It can therefore be said that a grouping of frames is carried out on the basis of decisions of the encoding algorithm, whereas the segmentation is carried out a priori or independently of the criteria regulating the encoding thereof. If the input signal does not include a grouping (for example, in the event that the signal acquired in step S100 is in a digital but not MPEG format), the preset duration of the segment can be equal to a predetermined time, for example exactly one minute. In such a case, the input signal, for example in HD-SDI format, will be exactly broken down into segments of one minute (one minute is a non-limiting example; other values can be 10 s or less, 2 min, 10 min, or even more). If, on the other hand, the input signal is a grouped signal (for example in MPEG2, MPEG4, AVC, H.264 format, etc. . . . ), the preset duration of the segment can (but need not necessarily) be equal to a predetermined time plus or minus a certain pre-established value that we shall indicate as $\Delta$, and also call pre-established variance. The $\Delta$ (delta) value can be selected as equal to the maximum predictable length of the GOP of the input signal, equal to average duration (predicted, statistical or based on the flow received thus far) of the GOP of the input signal, or equal to a quantity in turn established in advance to enable the segment to be closed exactly at the end of a GOP of the input signal. What we have said will be clarified by means of an example: let us suppose that the input signal is characterized by a GOP with a variable length but having an average length of 0.5 s, and that the length of the segment must be equal to about 1 minute in order to have a nearly constant delay of about one minute. Since the length is variable, it cannot be ruled out that at the sixtieth second of the segment in question the GOP of the input signal may not yet be finished: let us assume that N frames (for example 10 frames) still remain in order to close it. Setting the delta at a value equal to twelve frames (in the example, the average length of the input GOP) will enable the input signal to be divided at the sixtieth second plus twelve frames or at the sixtieth second minus twelve frames, or within the interval (60 s–$\Delta$, 60 s+$\Delta$). Other examples are possible, in which the interval in question is (60 s, 60 s+$\Delta$), (60 s–$\Delta$, 60 s), (60 s–$\Delta 1$, 60 s+$\Delta 2$), with $\Delta 1$ and $\Delta 2$ greater than or equal to zero. This enables the segment to be closed with the closure of the corresponding GOP of the input signal; that is, the last frame of the segment coincides with the last frame of a GOP of the input signal. It can therefore be said that the preset duration corresponds to the combination of a predetermined time and a pre-established variance (represented in the examples respectively by 60 s and the Δ value). In other words, the preset duration falls within a time interval determined by the combination of a predetermined time and a pre-established variance. The following should also be noted. In order to prevent the latency from increasing excessively over time and with the passing of segments, the Δ can be periodically varied. For example, if ten consecutive segments were all to be segmented for a length equal to one minute plus twelve frames, the segmentation of the subsequent segments can be carried out in advance (thus with a negative delta) for a certain number of successive segments until the overall latency falls within certain limits.

The variation in the delta value can thus be controlled on the basis of the overall latency measured at a certain instant (or at sample instants) or on the average of the latencies introduced by the last M (with M as great as desired) segments.

According to a first illustrative example, the off-line encoding optionally enables a single segment, or at least part of it, to be processed several times. According to another example, the processed signal, processed one or more times as in the first example, can be analyzed to detect imperfections due to the compression process, which can thus be optionally removed and/or corrected.

According to an illustrative option, the off-line encoding can include a variation in the length of the group of frames. For example, in the case of H.264 encoding, the off-line encoding can decide, after having analyzed the whole segment or a substantial part of it, to vary the length of the GOP within the segment in such a way as to optimize the compression and quality. For example, if the analysis of the entire (or part of the) segment reveals the presence of a static scene, the encoder can decide to adopt a very long GOP (for example 5, 10 or more times longer than a real-time encoder would have selected) and thus obtain a high level of compression that could not be achieved by a real-time compression, since the latter is not capable of analyzing many frames in the future.

According to a further illustrative option, the off-line encoding can comprise processing a segment several times in order, for example, to detect, remove and/or correct any imperfections. The repeated processing can also comprise applying, in each iteration, various compression parameters in order to select the best encoding at the end of a certain number of iterations.

In the example in which the input signal is grouped, the segment consists of a finite number of groups of the input signal. As already explained above, in fact, in such a case the preset duration will be equal to a predetermined time and a variance Δ to make sure that the segment is closed not at a predefined timer but rather at the last frame of the GOP of the input signal. Also conceivable is a case in which it is actually desired to limit the preset duration to a predetermined time (i.e. with delta equal to zero), for example one minute, notwithstanding the grouping of the input signal. In such a case, it will be necessary to decode the input signal so as to obtain an intermediate signal unlinked from the constraints of the previous encoding; in this manner, it will be possible to divide or interrupt the intermediate signal with the frame that falls exactly at the sixtieth second.

According to a further example, the continuous encoded signal is recomposed together with at least an audio signal or a data signal. The audio and data signals may or may not be compressed. Therefore, the method described above, for example with reference to FIG. 1, can be applied not only to the encoding of a video signal but also to the encoding of a signal also comprising an audio signal and/or a data signal.

In a further example, the continuous encoded signal associated with one channel is recomposed together with the video signals (optionally also with audio and/or data signals) of other channels.

According to a further example, the video signal included in the linear stream, as described above, can undergo real-time encoding before being acquired (S100) or after being acquired. For example, if the input signal is an SDI or HD-SDI signal, it is possible to carry out a first real-time compression to obtain a grouped signal according to a known standard (for example MPEG2, MPEG4 or H.264), that will then undergo the subsequent steps S200, S300, S400 and S500 as illustrated in FIG. 1. In such a case, the real-time encoding can be set to process only a very limited number of frames, for example a number between 10 and 15, so as to rapidly obtain a signal having a bandwidth of 10 Mb/s (for example with an average GOP length of 12 frames) and thus much more limited than that of, for example, an HD-SDI signal having a bandwidth, for example, of 1.5 Gb/s. In such a case, the segmentation can be performed on the signal encoded in real time. Alternatively, the segmentation can be performed prior to the real-time compression, i.e. directly on the HD-SDI signal. Each segment can thus undergo a first real-time segment compression, which will be followed by off-line encoding as per steps S300 and S400, thus making it possible to reach a high level of compression without impairing quality, while maintaining a preset, configurable latency.

In one illustrative example, the first encoding can be carried out by a first encoder, and the second encoding by a second encoder, wherein both the first and second encoders are part of an encoder structure dedicated to the linear stream. Greater details will be provided below with reference to FIG. 2.

A second embodiment will be illustrated below with reference to FIG. 2, which shows an entity for real-time encoding of a signal comprising at least a video signal. An entity can be implemented in a single device, via HW/SW or a combination thereof, or in multiple interconnected units or devices (similarly HW, SW or a combination thereof). All of the considerations already expressed with reference to the first embodiment will also apply in general below (and thus with reference to other embodiments or examples as well) and will therefore not be repeated.

The device 200 in FIG. 2 comprises acquiring means 210, dividing means 220, first encoding means 230, second encoding means 240 and recomposing means 250.

The acquiring means 210 are configured to acquire the video signal included in the linear stream, the linear stream comprising at least two contents without a logical distinction between them. The IN signal provided to the acquiring means is an example of the above-mentioned input signal, which can be in a grouped format (for example, according to standards such as MPEG2, MPEG4, AVC, H.264, etc. . . . ) or ungrouped format, because provided, for example, in HD-SDI, SDI format, etc. . . . , or in any digital format (because thus available from the source or after conversion from an analog signal).

The dividing means 220 divide the acquired signal into at least a first segment and a second segment of respective preset durations (as previously said, not necessarily identical), wherein at least one of the two segments is capable of containing at least a part of the two contents (in fact, it is important for at least one segment to have this property, in the event that it is possible to establish that the other segment will certainly contain only one content). The segments further comprise recomposing information, as mentioned above or as further detailed below.

The first encoding means 230 are configured to execute a first encoding of the first segment (221) using an off-line encoding, thus obtaining a first encoded signal 232. The second encoding means 240 are instead configured to execute a second encoding of the second segment (222) using an off-line encoding to obtain a second encoded segment 242. In the figure the output signals 221 and 222 are illustrated as being output from two distinct ports; the means 220 can be configured, however, to be emitted from the same port. The same applies for the inputs to the means 250. The second encoding is carried out at least partially in parallel with the first modification, for the reasons illustrated above, though it is conceivable that one of the two encoders 230, 240 may be omitted so that the encoding of the two segments takes place sequentially, provided that the remaining encoder has sufficient resources to ensure that the encoding is completed with the last frame or immediately after receipt of the last frame (in the event, for example, that the last portion of the frame is not compressed or compressed with a much lower compression factor to ensure completion of the compression at or nearly at the end of the segment).

Finally, using the recomposing information, the recomposing means 250 recompose the first encoded segment 232 and the second encoded segment 242 to obtain a continuous encoded OUT signal. The signal thus obtained can thus be broadcast, possibly after undergoing further processing.

It should be noted that FIG. 2 is a schematic representation. The acquiring means 210, dividing means 220, first and second encoding means 220 and 230 and recomposing means 250 (noting that they can also be identified as acquirer 210, divider 220, first and second encoder 230, 240 and recomposer 250, respectively) can be realized in the form of hardware, software or a suitable combination of the two. For example, the encoders 230 and 240 can be obtained through two separate hardware structures, or by means of a logical partition of a same hardware structure. It is moreover conceivable to combine various separate encoders with one or more higher performance encoders to be partitioned in a logical manner; this could prove useful in the presence, for example, of a large number of segments to be processed in parallel. Furthermore, use could be made of an encoder with a grid structure, capable of dividing the encoding work (schematically represented by the blocks 230 and 240) among a number of machines and processors simultaneously.

Figure 3:
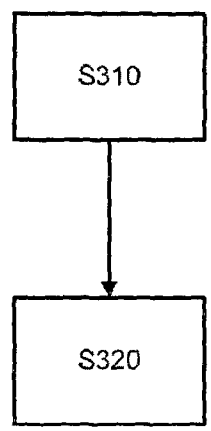
FIG. 3 illustrates a flow diagram of a method for treating a signal to be processed with near-real-time encoding according to a third embodiment.

With reference to FIG. 3, there will be illustrated a third embodiment relating to a method for treating a signal to be processed with near-real-time encoding, wherein the signal comprises at least a video signal. In a step S310, the video signal included in a linear stream is acquired, the linear stream comprising at least two contents without a logical distinction between them. This signal can be represented by the previously described input signal, for example one in a non-compressed format, in an SDI or HD-SDI format or in a format compressed according to a MPEG2, MPEG4, AVC, H.264 format, etc. . . . . In a subsequent step S320, the video signal is divided into at least a first segment and a second segment of preset duration, wherein each of the two segments is capable of containing at least a part of the two contents without a logical distinction. Each of the segments further comprises recomposing information. As mentioned above, the preset duration corresponds to the combination of a predetermined time and a pre-established variance, wherein the pre-established variance can take on a value of 0 in a specific case. If the pre-established variance takes on a value equal to 0, each segment will have a constant duration equal to the predetermined time until the predetermined time is manually or automatically changed as illustrated above. For example, if the predetermined time is equal to one minute and the pre-established variance is equal to 0, each segment will have exactly the length of one minute as long as none of those values is modified manually and/or automatically. If the input signal is grouped, it cannot be ruled out that the GOPs of the input signal may be characterized by a slightly variable length.

In order to obtain a segment that includes a whole number of GOPs, it will therefore be advisable to define the preset duration by adding or subtracting a pre-established variance to the predetermined time. Let us consider, for example, a predetermined time equal to 60 s and a pre-established variance equal to twelve frames, a value chosen because it coincides in the example with the average length of the GOP of the input signal. The end of a segment can thus be conveniently determined as corresponding with the end of the last frame of the GOP included in the interval (60 s−12; 60 s+12 frames). Reference is also made to the discussion set forth above, which, as said, also applies to this and other embodiments as well as examples. The recomposing information is such as to enable the reconstruction of the output segments, once encoded, so as to follow the same sequence as prior to segmentation. For example, the recomposing information is represented by a sequential number or by a unique identifier of each segment within each linear stream or channel, as illustrated above. The recomposing information is necessary since it cannot be ruled out that the encoding of a second segment, following the first one in time, may be completed before the encoding of the first segment. Let us think, for example, of a case in which the second segment refers to the closing credits of a film and the first segment to the last action scene of the same film: it cannot be ruled out that the encoding of the closing credits may be completed before the last action scene is encoded, in particular in the event that the frames need to be re-processed a number of times in the encoding of the action scene or in the event that errors are detected and need to be corrected in a further step. The recomposing information therefore serves to remedy an incorrect reconstruction of the encoded signal.

According to an optional step not illustrated in FIG. 3, the method can comprise a step of recomposing, using the recomposing information, a first encoded segment and a second encoded segment obtained by encoding the two segments resulting from step S320.

Figure 4:
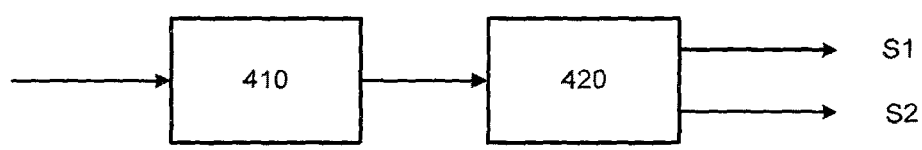
FIG. 4 illustrates a block diagram of an entity for treating a signal to be processed with near-real-time encoding according to a fourth embodiment.

FIG. 4 illustrates a further embodiment relating to a device for treating a signal to be processed with near-real-time encoding and comprising acquiring means 410 and dividing means 420. The acquiring means 410 are capable of acquiring the video signal included in a linear stream, the linear stream comprising at least two contents without a logical distinction between them. The dividing means 420 are configured to divide the video signal into at least a first segment and a second segment of preset duration, wherein each is capable of containing at least a part of one of the two contents without a logical distinction between them. Moreover, each of the segments comprises recomposing information. Thanks to this feature, it is possible to break down a continuous flow into segments of preset duration that are easy to process, for example (not by way of limitation) easy to subject to an off-line encoding transparent to the off-line encoder. The flow thus segmented can be more easily subjected to other operations that are normally not (directly) applicable to linear streams.

Figure 5:
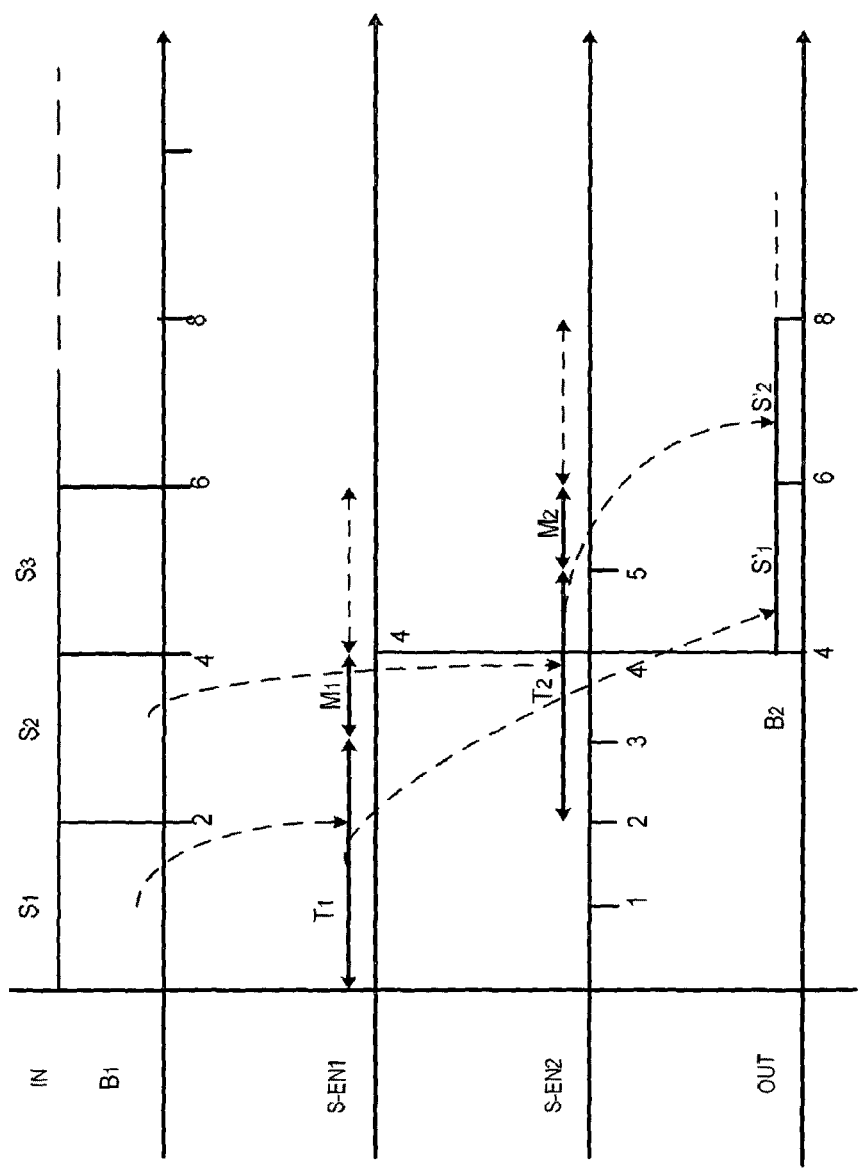
FIG. 5 illustrates an example for near real-time encoding of signals.

FIG. 5 illustrates an explanatory example in which an IN linear stream having a bandwidth B1 is processed according to the method illustrated in FIG. 1 or one of the variants thereof. In the example of FIG. 5, it is assumed that the IN signal is in HD-SDI format having a bandwidth of 1.5 Gb/s or is grouped into GOPs having an average length of 12 frames and bandwidth of 10 Mb/s obtained, for example, via the standard H.264. The IN stream is thus segmented into the segments S1, S2, S3 (and so forth according to need), each having a length of two minutes in the example (noting that the length could differ by a few milliseconds in order to include a whole number of GOPs (Ng) in the event that the IN signal is in group format. Assuming that there are only two encoders, the first segment S1 will be processed in an interval T1 and the second segment S2 in a corresponding interval T2.

The interval T2 will begin as early as possible at the moment when the segment S2 is available. At the end of each encoding, that is, at the end of the intervals T1 and T2, respectively, the compressed segments S'1 and S'2 are output in a sequence corresponding to the input segments S1 and S2 thanks to the recomposing information. In this manner, the sequence of the output frames corresponds to the sequence of the input frames. Although the intervals T1 and T2 are portrayed as having the same length, their encoding time can vary in practice, even substantially, as illustrated above in the example of the closing credits and action scene.

The off-line encoding applied, respectively, at times T1 and T2 must be such as to ensure completion of the compression of the entire segment before it has to be output. In the illustrated example, there will be corresponding margins M1 and M2 indicating that each of the encoders has completed the respective operations a certain amount of time in advance relative to the moment when the segment must be output (the two segments must be output respectively at 3:00 and 5:00 minutes). This means that by sizing, for example, the encoder relative to a typical case, it will be possible to provide for a safety time M1 or M2 to process particularly complex segments (for example, ones rich in details or scene changes) or to correct unexpected errors.

FIG. 5 illustrates the example in which two segments are processed in parallel. However, the person skilled in the art will immediately recognize the same parallelization can be applied in the case of a number N (as large as desired) of segments to be processed in parallel. In such a case, there will be N distinct processes rather than two, carried out by an encoder with a grid architecture, by N distinct encoders or by any suitably configured HW/SW combination. As mentioned above, it is also conceivable to dispense with parallelization in the event that a particularly powerful encoder is available, for example one capable of performing an excellent compression on most of the segment (excluding, for example, the last part of the segment, for example the last 20 frames or the last or some of the last GOPs), in such a way as to complete the process at the moment when the last GOP of the respective segment is received (or a few instants after the last frame has been received, for example the equivalent of 10-50 frames from the end of the segment). As said, the values in FIG. 5 are purely examples. In another example, one could choose a 32 sec segment with a time of 4 min left to off-line encoding. The latency remains constant (at the limit in the interval established by the tolerance or variance as described above) because, in the 4 minutes necessary for encoding the first segment, the encoding of the subsequent segments is started (in parallel) and thus the first segment is ready at 4:00, the second at 4:32, the third at 5:04 and so forth.

According to another embodiment, the present invention further comprises a program for a computer configured to carry out, when the program is run on a computer, one or more of the steps according to the method described above or one of the variants thereof. The computer on which this program can be run is to be understood as any system capable of processing signals and processing instructions, made up of one or several interconnected units, capable of executing instructions that are programmed or configured for the execution of the above-described steps.

The instructions of the program for a computer can moreover be stored in a suitable medium, such as, for example, a static memory, a hard disk or any other medium such as a CD, DVD or Blue Ray, or they can be transmitted via a carrier signal for execution on a remote entity.

As stated above, the recognitions of the inventors have led to a novel solution for video encoding which exploits the mechanisms of off-line compression, but exploits them within a time such as to ensure a maximum delay in the order of a few minutes (in the example in FIG. 5). This video encoding mode is defined as near live or near real-time. The steps of the near real-time video encoding process are the following, in this further illustrative example:

acquisition of the input audio/video/subtitles signal, live compression of the audio/video signal in a high quality format with a high bit rate and simultaneous extraction and saving of subtitles; for example, the process of acquiring the HD-SDI signal is carried out by means of a specific acquisition board installed in a server. The 1.5 Gbit/s signal cannot be written at this bit rate on the commonly used media, so there is a first encoding carried out at 50 Mbit/s in CBR with GOP at 4 seconds (this is not a binding choice). The GOP is set as "closed" in such a way as to enable the continuous stream to be divided into a number of segments of preset duration. Also acquired at this stage (in this example) are the subtitles within the VANC of the SDI which are extracted in binary form and segmented in such a way as to be synchronous with the audio/video stream so that for every audio/video segment there is a corresponding subtitle segment.

division of the continuous audio/video stream (without logical distinction between one content item and another) into segments (consisting of n-GOPs or groups of pictures) of preset duration by the operator, with the extraction of in/out information (i.e. information that enables the segments to be re-aggregated);

subdivision and encoding of the audio/video segments in a mutually independent manner (i.e. each segment is processed in parallel and, potentially exploiting a larger number of encoders, a number of segments can be processed simultaneously in several encoders); in this step the segmented stream (in segments with a duration of two minutes in one example) can be encoded by a VOD encoder. For this reason it may be convenient to use a VOD encoder with grid architecture, capable of dividing the encoding work among a number of machines and processors simultaneously, further ensuring the possibility of reworking any segments that should provoke errors.

multiplexing of the encoded audio/video segments (n-GOPs) with the respective subtitles, maintaining the temporal synchronism (i.e. re-aggregation of the segments using the in/out information extracted in the step of dividing the continuous audio/video stream).

In fact, once the encoding of the various segments has been completed, the audio, video and subtitle streams must be "put together" (multiplexed) in such a way as to have a single stream (transport stream) composed of video, audio and subtitles. Having the different elementary streams at its disposal, the muxer (for example a custom component developed on commercial libraries produced, for example, by "Manzanita") puts them together, abiding by the standards called DVB-S2, in such a way as to form a single transport stream with the single components together.

continuous playout of the multiplexed segments, in the encoder output format: the last optional stage in the chain in the present example is playout. The aim of this component is to send the transport stream continuously toward the multiplexer of the satellite transmission chain. The output is delivered in a format complying with ASI specifications, on an SDI or IP channel. The playout is synchronized with the acquisition process and applies a constant delay in the reproduction of frames, in the order of minutes relative to the time of acquisition.

As mentioned above, thanks to the recognition of the inventors a result is obtained which ensures a high quality, maintains the processes unchanged, and has a bandwidth efficiency that is 30-40% higher than the one used today, which means an equivalent benefit in terms of transmission bandwidth.

The overall architecture of the encoder lends itself to being distributed over several physical servers. For example, in a configuration made up of two servers, one will host the acquisition and playout processes and the other will host the encoding grid.

In particular the recognition of the inventors enables an efficient solution of off-line compression applied to linear distribution, since it divides the continuous audio/video signal into segments of a duration that is preset by the operator (and can range from a few seconds to a few minutes, based on the power and number of the encoders that must process the segments in parallel) and is able to start a continuous stream for off-line compression (created to manage individual contents that are separate from one another), obtaining as output a continuous compressed stream with the quality typical of off-line compression but managed with a delay of just a few minutes (in the example in FIG. 5). And thus with the near real-time compression process the compression quality is improved compared to the real-time compression adopted up to now for satellite broadcasting (because the potentialities of off-line compression are exploited) and yet a process is created which (thanks to the creation of segments that can be re-aggregated and are set on the possibility of parallel management by the available encoders) can also be adapted to linear distribution. It should be noted that a method for managing a continuous audio/video stream with off-line compression and with a delay of just a few minutes serves to improve distribution in satellite broadcasting (off-line compression is up to 40% more efficient than real-time compression).

This solution can moreover be applied to a significant percentage of the contents distributed by an operator: in fact, up to 60% (or more) of the contents normally distributed can be processed through the segmentation-compression in parallel—re-aggregation sequence, in such a manner as not to determine any interruption in the linear distribution stream, thus making it possible to achieve considerable bandwidth savings (even 40% or more) that are not imaginable with the present linear channel encoding systems.

In addition to what has already been disclosed and for further illustrative purposes, we shall also note other features of an off-line compression process.

For example:

(A) in off-line compression individual contents are processed rather than continuous streams of contents (i.e. contents having a beginning and an end, like a film, an advertisement, a promo, etc. are processed) and thus the product of the compression, even when placed in sequence, does not lose this individuality. Contents that are compressed off-line, where joined together in sequence, do not have an end which perfectly fits with the start of the subsequent content and to ensure the splice between contents it is necessary to insert "black" elements.

(B) off-line compression is particularly efficient (the quality of the output being equal, it can compress 40% more content than real-time compression) but requires a long and accurate process, because the entire content is processed more than once and, if there are any imperfections in the compression process, they are detected and removed. This accurate process requires 2-3 times the duration of an individual content (that is, if we need to compress off-line a film that lasts 2 hours, it can take us up to 6 hours).

The following should also be noted with regard to the creation of segments according to what has been recognized by the inventors. Off-line compression is generally applied to complete contents (a film, an advertisement, etc.) and thus has operating times that are not compatible with linear distribution (it would in fact entail a delay of several hours). Contents processed off-line cannot be placed in sequence without inserting "black" elements, because the end of one content does not fit perfectly with the beginning of the subsequent content. The video encoding solution envisages dividing the continuous audio/video stream into segments of a given duration. It should be noted that the segments do not necessarily coincide with a content or with a portion of content (i.e. in a segment the end of one content and the beginning of another content could coexist, without solution of continuity). Together with the segments, in/out information is extracted from the continuous audio/video stream; this enables the continuous audio/video stream to be recomposed after the off-line compression process exactly as it was prior to the compression. The segment duration is predetermined by the operator (and can range from a few seconds to several minutes). Said duration can be calibrated based on the power and number of the available encoders and based on the number of segments that must be processed in parallel. Calculating the duration of the segments enables the off-line compression process to proceed fluidly (i.e. the segments do not last longer than it takes the encoders to process them in parallel, so that no "bottleneck" is created between what comes in and what goes out of the encoder). The segments can have a duration such as to enable an off-line compression with a delay limited to just a few minutes.

Many of the embodiments and examples have been illustrated with reference to steps of methods or processes.

However, what has been described can also be implemented in a program to be run on a computing entity (also a distributed one) or on an entity with appropriately configured means. As illustrated above, the entity can be implemented in a single device, via HW/SW or a combination thereof, or in multiple interconnected units or devices (likewise HW, SW or a combination thereof).

Naturally, the description set forth above of embodiments and examples applying the principles recognized by the inventors is given solely for the purpose of exemplifying such principles and must therefore not be construed as a limitation of the scope of the patent rights claimed here.

The invention claimed is:

1. A method for near-real time encoding of a signal comprising at least a video signal, the method comprising the steps of:
   acquiring said video signal included in a linear stream, said linear stream comprising at least two contents without a logical distinction between them;
   dividing the video signal into at least a first segment and a second segment of respective preset durations, at least one of said segments being capable of containing at least a part of said two contents, and each of said at least first and second segments include recomposing information enabling reconstruction of a first encoded segment and a second encoded segment to follow a sequence that is the same as the first segment and the second segment;
   executing a first encoding of said first segment using an off-line encoding to obtain the first encoded segment;
   executing a second encoding of said second segment using an off-line encoding to obtain the second encoded segment, said second encoding being executed at least partially in parallel with the first encoding;
   recomposing, using said recomposing information, said first encoded segment and said second encoded segment to obtain a continuous encoded signal,
   wherein the latency introduced by the near-real time encoding is configurable and nearly constant.

2. The method according to claim 1, wherein the off-line encoding is such that encoding of a respective segment is completed in a time which is shorter than or equal to a pre-configured delay.

3. The method according claim 1, wherein each of said preset durations is comprised in an interval determined by a combination of a predetermined time and a pre-established variance.

4. The method according claim 1, wherein said first segment and second segment are distinct from groups of frames obtained through a video encoding algorithm.

5. The method according claim 1, wherein the off-line encoding comprises at least one step between:
   varying a length of a group of frames inside one segment;
   processing a segment several times, and wherein the processing comprises at least one step among detecting, removing and correcting possible defects.

6. The method according claim 1, wherein, where an incoming signal is grouped, a segment is composed of a finite number of groups of the incoming signal.

7. An apparatus for near-real time encoding of a signal comprising at least a video signal comprising:
   acquiring means configured to acquire said video signal included in a linear stream, said linear stream comprising at least two contents without a logical distinction between them;
   dividing means configured to divide the video signal into at least a first segment and a second segment of preset duration, at least one of said segments being capable of containing at least a part of said two contents, and each of said at least first and second segments include recomposing information enabling reconstruction of a first encoded segment and a second encoded segment to follow a sequence that is the same as the first segment and the second segment;
   first encoding means configured to execute a first encoding of said first segment using an off-line encoding to obtain the first encoded segment;
   second encoding means configured to execute a second encoding of said second segment using an offline encoding to obtain the second encoded segment, said second encoding being executed at least partially in parallel with the first encoding;
   recomposing means configured to recompose, using said recomposing information, said first encoded segment and said second encoded segment to obtain a continuous encoded signal;
   wherein the latency introduced by the near-real time encoding is configurable and nearly constant.

8. A method for treating a signal to be processed with near-real time encoding, said signal comprising at least a video signal, said method comprising the steps of:
   acquiring said video signal included in a linear stream, said linear stream comprising at least two contents without a logical distinction between them;
   dividing the video signal into at least a first segment and a second segment each having respective preset durations, at least one of said segments being capable of containing at least a part of said two contents without a logical distinction, and each of said at least first and second segments include recomposing information enabling reconstruction of a first encoded segment and a second encoded segment to follow a sequence that is the same as the first segment and the second segment.

9. The method according to claim 8, wherein said video signal included in said linear stream is processed with a real-time encoding before being acquired to obtain a grouped video signal, and wherein each respective said preset duration is comprised in an interval determined by a combination of a predetermined time and a pre-established variance.

10. The method for treating a signal according to claim 9, further comprising the step of recomposing, using said recomposing information, a first encoded segment and a second encoded segment to obtain a continuous encoded signal, said first and second encoded segments obtained from said first segment and second segment through an off-line encoding algorithm.

11. A non-transitory computer-readable medium for near-real time encoding of a signal comprising at least a video signal, the non-transitory computer-readable medium having computer-readable instructions stored thereon which, when executed by a computer system, cause the computer system to perform the steps of:
   acquiring said video signal included in a linear stream, said linear stream comprising at least two contents without a logical distinction between them;
   dividing the video signal into at least a first segment and a second segment of respective preset durations, at least one of said segments being capable of containing at least a part of said two contents, and each of said at least first and second segments include recomposing information enabling reconstruction of a first encoded segment and a second encoded segment to follow a sequence that is the same as the first segment and the second segment;
   executing a first encoding of said first segment using an off-line encoding to obtain the first encoded segment;
   executing a second encoding of said second segment using an off-line encoding to obtain the second encoded segment, said second encoding being executed at least partially in parallel with the first encoding;
   recomposing, using said recomposing information, said first encoded segment and said second encoded segment to obtain a continuous encoded signal, wherein the latency introduced by the near-real time encoding is configurable and nearly constant.

* * * * *